United States Patent [19]
Hsiu-Chen

[11] Patent Number: 6,003,696
[45] Date of Patent: Dec. 21, 1999

[54] ADJUSTABLE SUPPORT FRAME OF RACK

[76] Inventor: Lai Hsiu-Chen, No. 1, Lane 150, Chang Lu Road, Chang Hua City, Taiwan

[21] Appl. No.: 09/235,204

[22] Filed: Jan. 22, 1999

[51] Int. Cl.[6] .............................. A47F 5/14; A47B 43/00
[52] U.S. Cl. ........................................... 211/182; 211/207
[58] Field of Search .................................... 211/182, 206, 211/207, 204; 403/227, 226, 118, 110, 109.1, 104; 285/298, 302

[56] References Cited

U.S. PATENT DOCUMENTS

| 3,136,570 | 6/1964 | Lee | 285/298 |
|---|---|---|---|
| 5,743,412 | 4/1998 | Noble | 211/182 X |

*Primary Examiner*—Jerry Redman
*Assistant Examiner*—Erica B. Harris
*Attorney, Agent, or Firm*—Harrison & Egbert

[57] ABSTRACT

A rack is made up of a plurality of support rods and locating devices for locating the support rods. Each of the locating devices are composed of a hollow tubular body, an elastic ring, and a control piece. The tubular body is provided respectively at both longitudinal ends thereof with outer threads and an outer tapered circular edge. The control piece is tubular in shape and is provided with a center through hole and an inner tapered circular edge. The elastic ring is disposed between the outer tapered circular edge of the tubular body and the inner tapered circular edge of the control piece. The support rod is received in the hollow interior of the tubular body and the center through hole of the control piece such that the outer wall of the support rod is pressed against firmly by the elastic ring at the time when the control piece is so turned as to cause the inner tapered circular edge thereof to press against the elastic ring.

1 Claim, 11 Drawing Sheets

ADJUSTABLE SUPPORT FRAME OF RACK

FIELD OF THE INVENTION

The present invention relates generally to a rack, and more particularly to an adjustable support frame of the rack.

BACKGROUND OF THE INVENTION

The conventional support frame of the rack is generally composed of a plurality of cross rods and upright rods, which are fastened fixedly together. As a result, the conventional support frame of the rack can not be adjusted in height and width. In addition, the conventional support frame of the rack can not be easily stored, packaged, or shipped.

SUMMARY OF THE INVENTION

The primary objective of the present invention is therefore to provide an adjustable support frame of a rack, which can be adjusted in height and width.

It is another objective of the present invention to provide a support frame of a rack, which can be disassembled and reassembled so as to facilitate the storage, the package, or the shipment of the rack.

In keeping with the principle of the present invention, the foregoing objectives of the present invention are attained by a rack support frame consisting of a plurality of expandable support rods and locating devices for locating the support rods. Each of the locating devices is composed of a tubular body, an elastic ring, and a control piece. The expandable support rods can be adjusted in height or width.

The foregoing objectives, features, functions, and advantages of the present invention will be more readily understood upon a thoughtful deliberation of the following detailed description of the embodiments of the present invention with reference to the accompanying drawings.

DETAILED DESCRIPTION OF THE EMBODIMENTS

Figure 1:
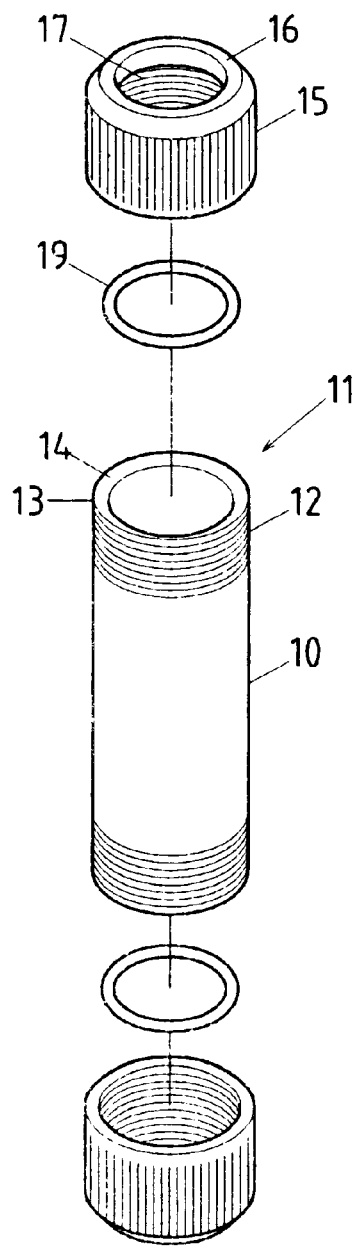
FIG. 1 shows an exploded view of a first preferred embodiment of the present invention.
Figure 2:
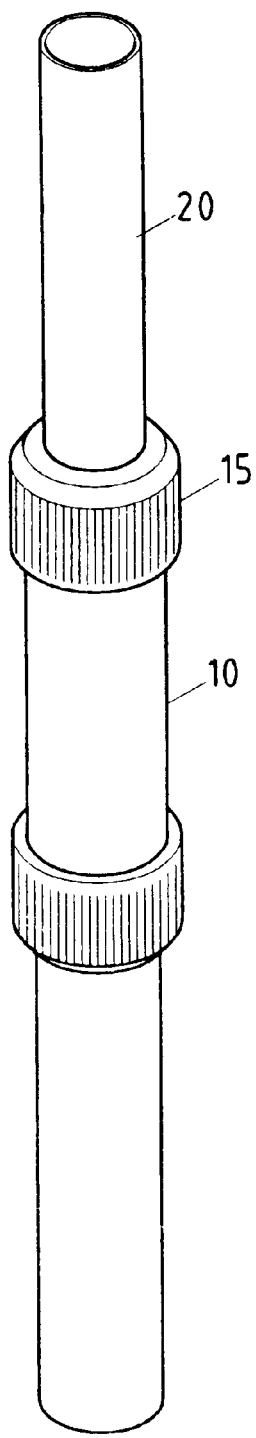
FIG. 2 shows a perspective view of the first preferred embodiment of the present invention in combination.

As shown in all drawings provided herewith, a rack 30 of the present invention is composed of a plurality of support rods 20 and locating devices which are composed of a hollow tubular body 10, an elastic ring 19, and a control piece 15.

The support rods 20 are arranged horizontally and uprightly and are located by the locating devices.

The hollow tubular body 10 is provided at one end 11 thereof with outer threads 12. The end 11 has an edge 13 which is provided with an outer tapered circular edge 14. The elastic ring 19 is retained by the outer tapered circular edge 14. The control piece 15 is of a tubular construction and is provided in the center thereof with a through hole 17. The control piece 15 has an outer end wall 16 which is provided with an inner tapered circular edge 18.

Figure 3:
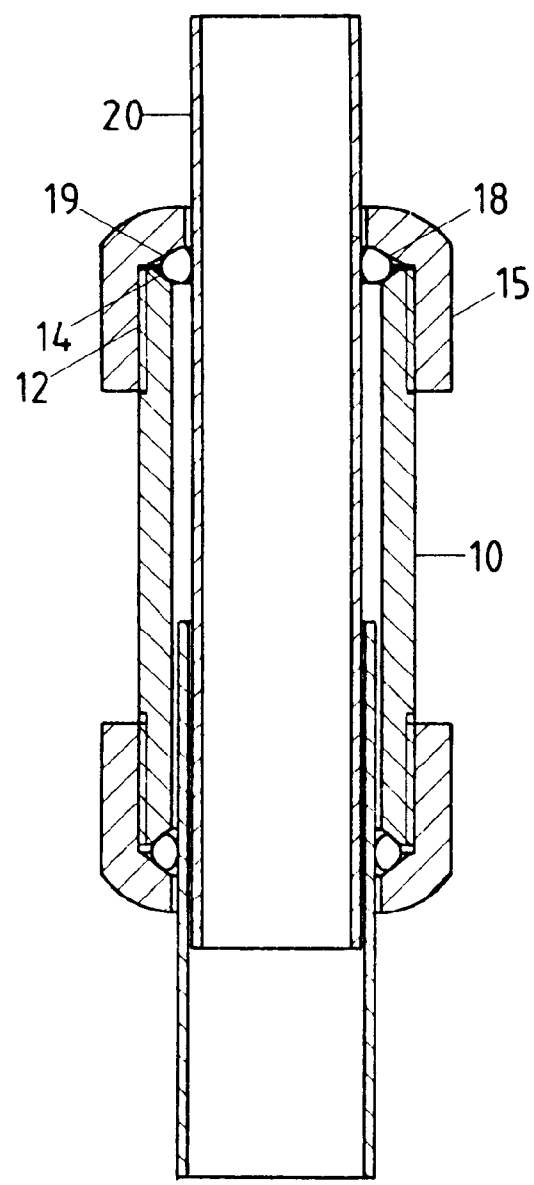
FIG. 3 shows a longitudinal sectional view of the first preferred embodiment of the present invention in combination.
Figure 4:
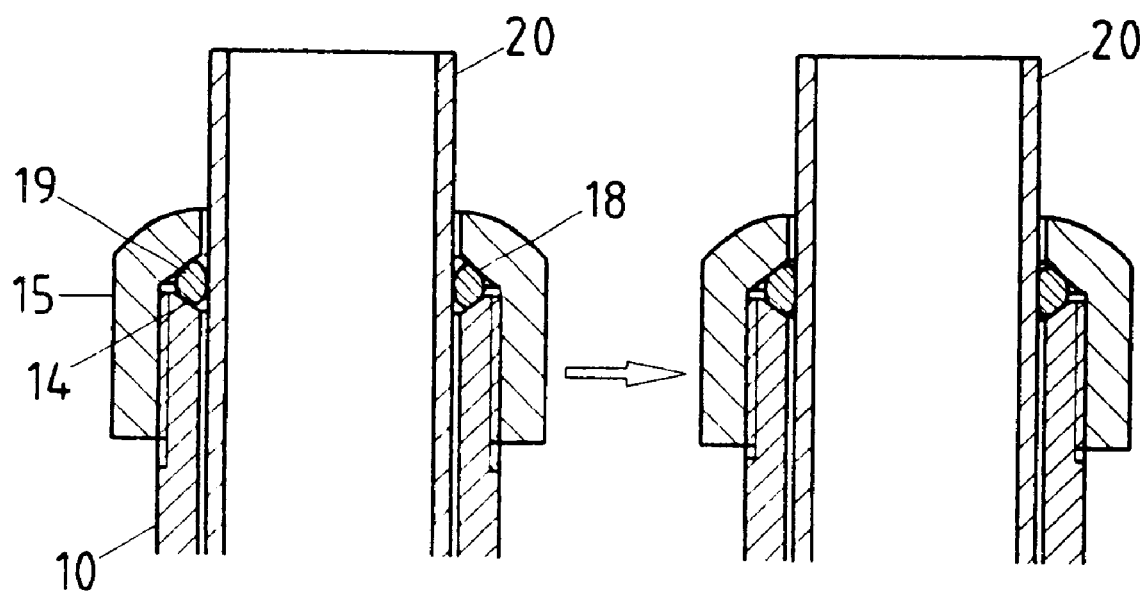
FIG. 4 shows longitudinal sectional views to illustrate the first preferred embodiment of the present invention in operation.
Figure 5:
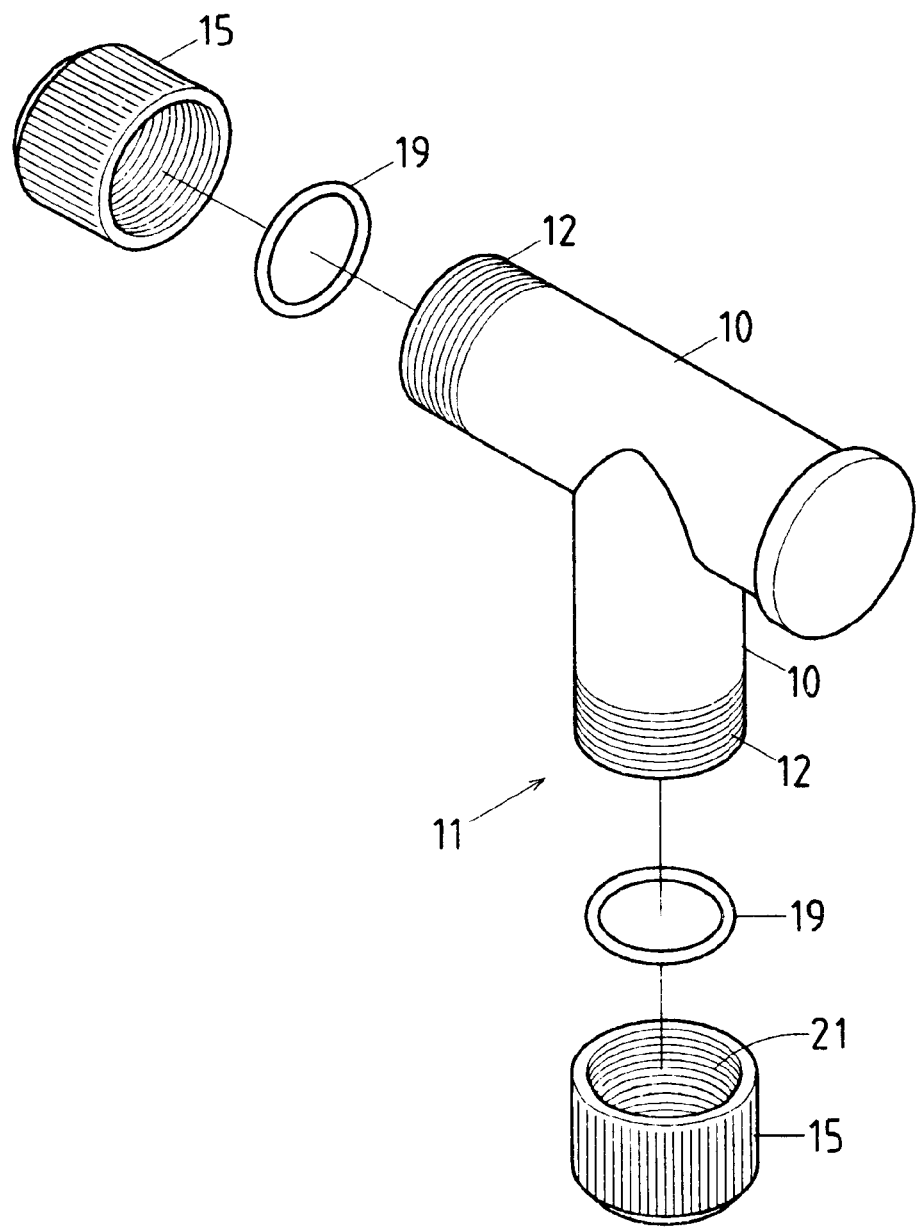
FIG. 5 shows an exploded view of a second preferred embodiment of the present invention.
Figure 6:
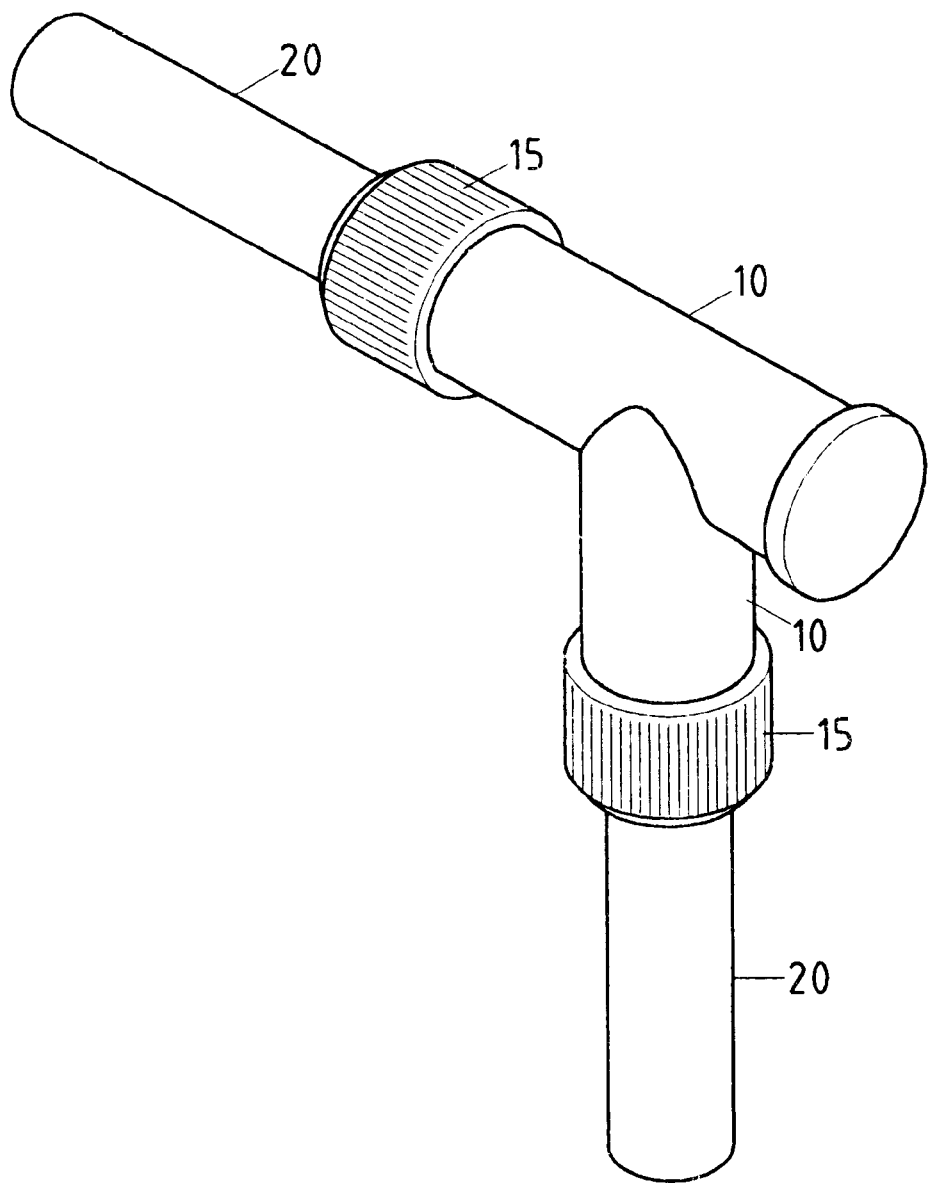
FIG. 6 shows a perspective view of the second preferred embodiment of the present invention in combination.
Figure 7:
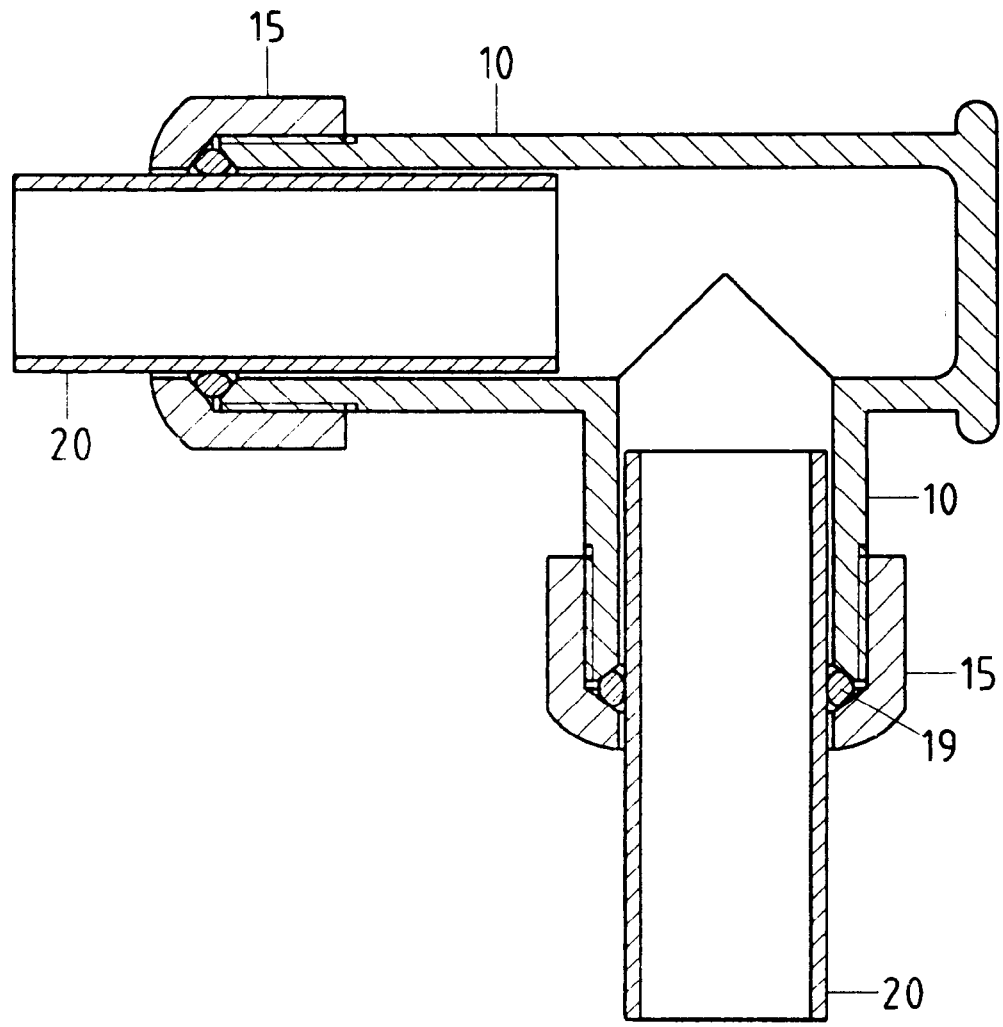
FIG. 7 shows a sectional view of the second preferred embodiment of the present invention in combination.
Figure 8:
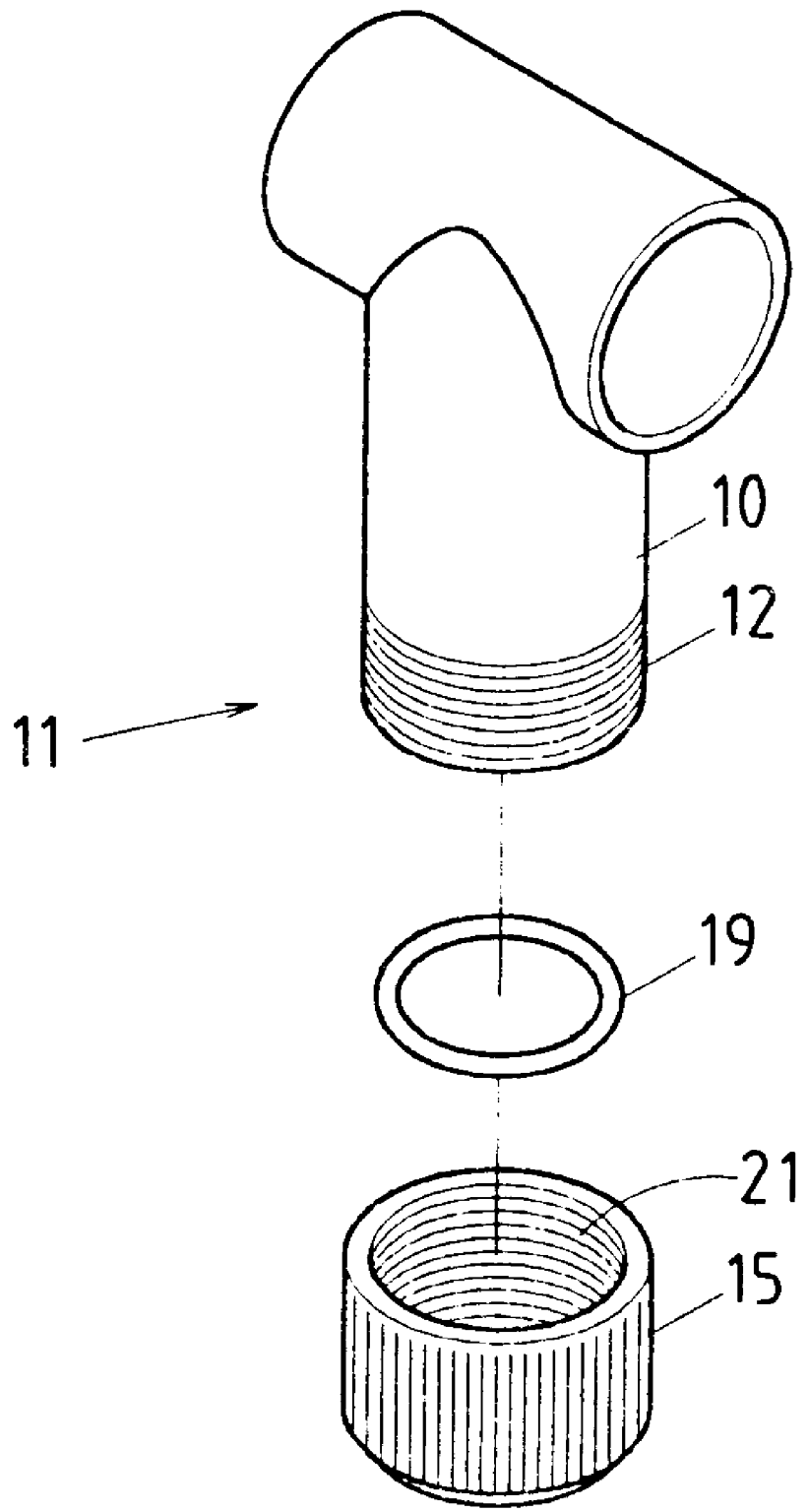
FIG. 8 shows an exploded view of a third preferred embodiment of the present invention.
Figure 9:
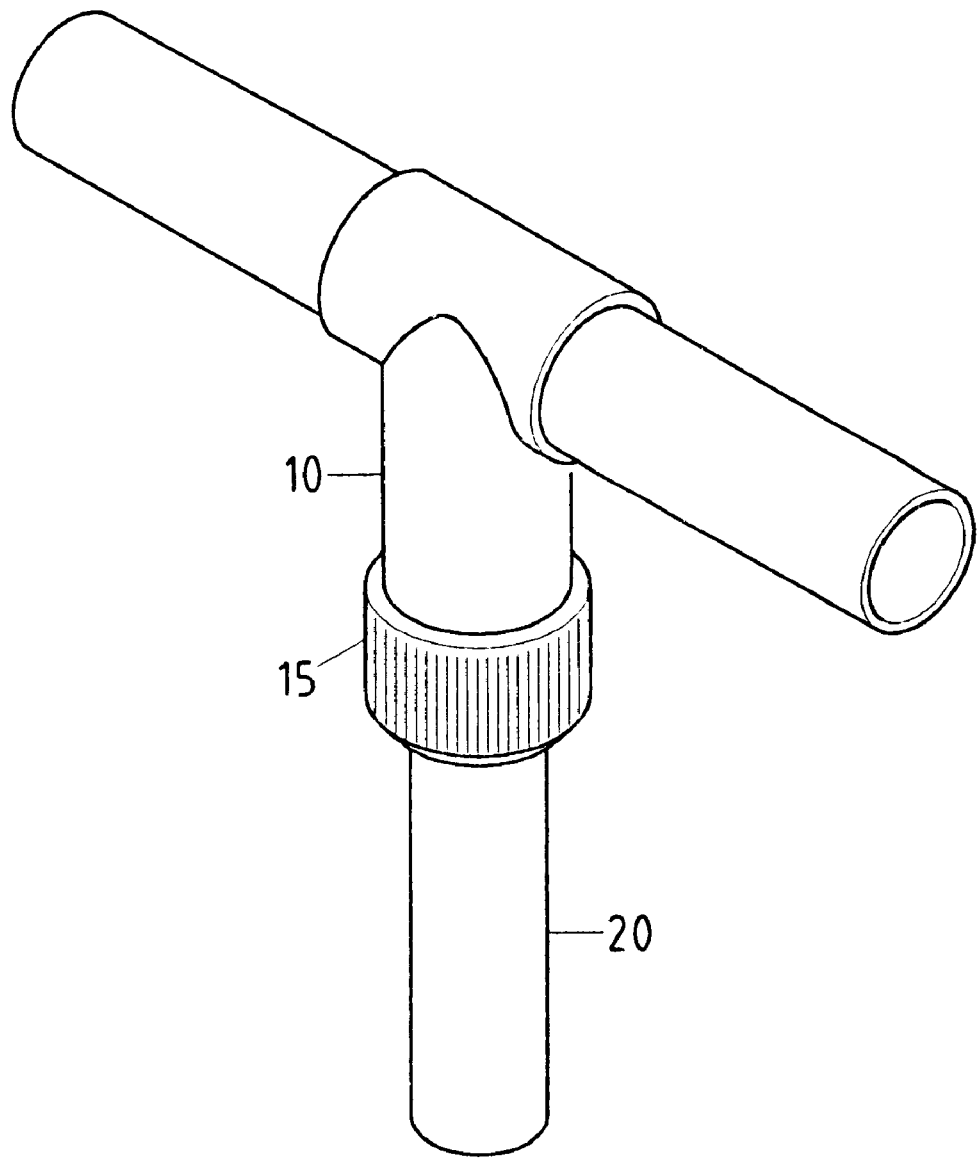
FIG. 9 shows a perspective view of the third preferred embodiment of the present invention.
Figure 10:
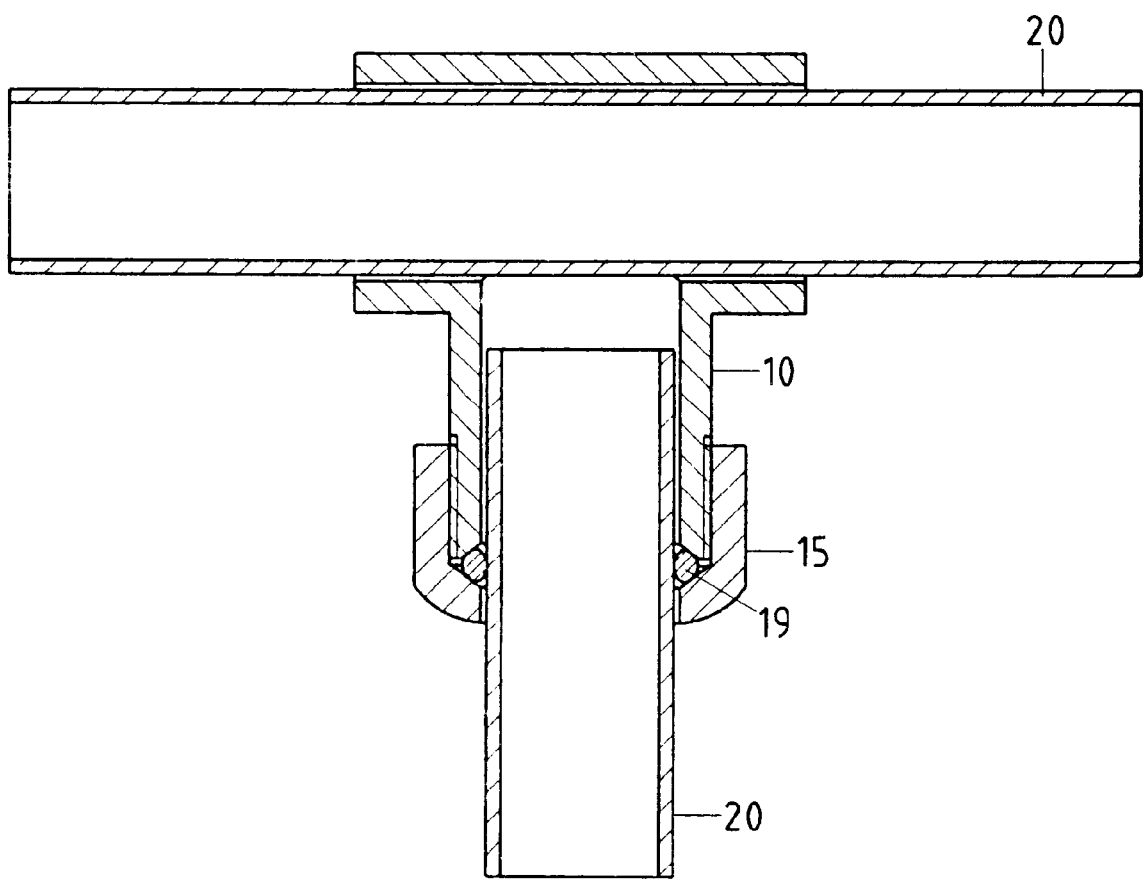
FIG. 10 shows a sectional view of the third preferred embodiment of the present invention in combination.
Figure 11:
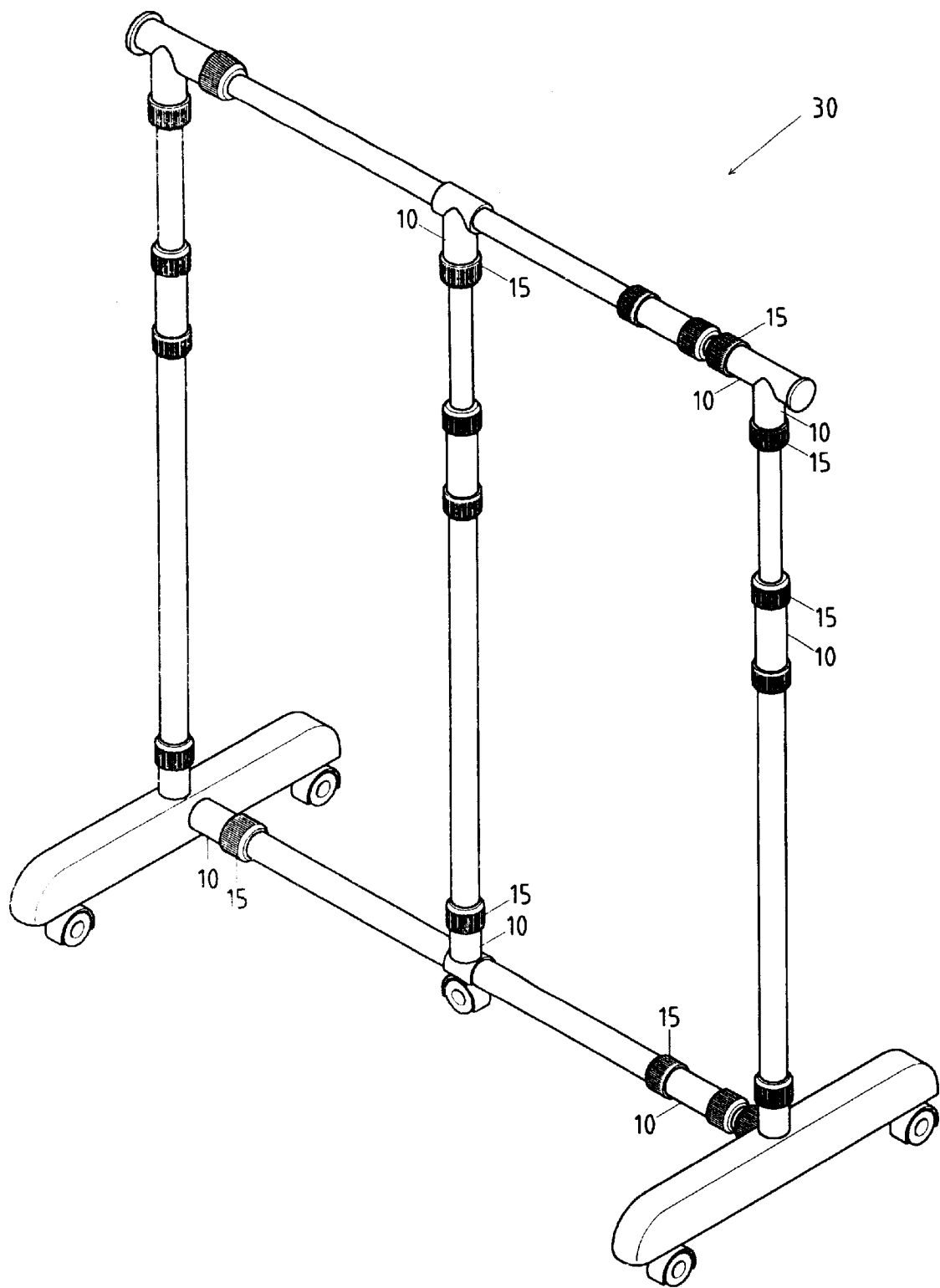
FIG. 11 shows a perspective view of a rack formed by the support frame of the present invention.

In combination, the support rod 20 is received in the hollow interior of the tubular body 10 and the through hole 17 of the control piece 15. Thereafter, the control piece 15 is turned toward the end 11 of the tubular body 10 such that the elastic ring 19 is pressed against by the outer tapered circular edge 14 of the tubular body 10 and the inner tapered circular edge 18 of the control piece 15, as shown in FIGS. 3 and 4. The elastic ring 19 is therefore deformed to press securely against the outer wall of the support rod 20. The support rod 20 is thus located. As the control piece 15 is loosened, the support rod 20 can be relocated.

As shown in FIGS. 5–11, the locating device of the present invention may include two tubular bodies 10 which are arranged in various forms and angles. As a result, the support rods 20 of the rack 30 can be assembled in various ways. In particular, in FIGS. 5 and 8, it can be seen that the threads 21 are formed on the interior of control piece 15. These interior threads 21 engage the outer threads 12 formed on hollow tubular body 10.

I claim:

1. A rack comprising a plurality of support rods and a plurality of locating devices each adapted to position an adjacent pair of said plurality of support rods, each of said plurality of locating devices comprises a hollow tubular body, elastic rings, and control pieces, said tubular body being provided at both longitudinal ends thereof with outer threads and an outer tapered circular edge, each of said control pieces being a tubular construction and having a through hole in a center thereof, each of said control pieces having an inner tapered circular edge at an outer end wall thereof, said elastic rings being positioned between said outer tapered circular edge of said tubular body and said inner tapered circular edge of each control piece, each of said support rods being received in a hollow interior of said tubular body and said through hole of said control pieces such that an outer wall of said support rod is pressed against securely by one of said elastic rings when each of said control pieces is tightened on said outer threads of said tubular body to cause said inner tapered circular edge thereof to press against one of said elastic rings, one of said adjacent pair of support rods being telescopically received by another support rod of said adjacent pair, one of said control pieces engaging said one of said adjacent pair of support rods, another of said control pieces engaging said another support rod so as to fix a position of said adjacent pair of support rods with respect to each other.

* * * * *